United States Patent [19]

Sakai

[11] 3,924,107

[45] Dec. 2, 1975

[54] THE PATH OF A VEHICLE METHOD AND APPARATUS FOR RECORDING

[76] Inventor: Hideo Sakai, No. 625, Ikemodai, Takatsu-cho, Tsuchiura, Tbaragi, Japan

[22] Filed: Mar. 1, 1974

[21] Appl. No.: 447,415

Related U.S. Application Data

[63] Continuation-in-part of Ser. No. 279,357, Aug. 10, 1972, abandoned.

[30] Foreign Application Priority Data

Aug. 11, 1971   Japan................................ 46-60266

[52] U.S. Cl. ........ 235/150.2; 235/150.27; 250/222; 250/236
[51] Int. Cl.²......................... G01S 5/16; G06G 7/22
[58] Field of Search....... 235/150.2, 150.27, 150.24, 235/92 R, 92 TC; 250/203, 222, 236

[56]         References Cited
              UNITED STATES PATENTS

| | | | |
|---|---|---|---|
| 3,401,937 | 9/1968 | Rockwood et al. | 250/222 R |
| 3,471,697 | 10/1969 | Riddle | 250/203 R |
| 3,590,225 | 6/1971 | Murphy | 235/92 R |
| 3,619,630 | 11/1971 | McLeod et al. | 250/222 R |
| 3,692,414 | 9/1972 | Hosterman et al. | 250/236 |
| 3,727,067 | 4/1973 | Shepherd | 250/236 |

*Primary Examiner*—Felix D. Gruber
*Attorney, Agent, or Firm*—William Anthony Drucker

[57]              ABSTRACT

For detecting and analyzing movement of a test vehicle over a test zone, the test vehicle is intercepted, at intervals throughout its travel, by two light beams scanning the test zone from spaced points on a base line bounding the test zone, the intervals of time occurring, at each occasion of scanning, between the moment when each light beam is coincident with the base line and thereafter coincident with the vehicle, being converted into $x$- and $y$-coordinate information and subsequently plotted to provide functions of the movement of the vehicle over the test zone.

2 Claims, 15 Drawing Figures

THE PATH OF A VEHICLE METHOD AND
APPARATUS FOR RECORDING

This is a continuation-in-part of my co-pending U.S. Pat. application Ser. No. 279357 filed Aug. 10, 1972 now abandoned.

The present invention relates to a measuring instrument adapted to detect and analyse the path of travel of an automotive vehicle under test at high speed with a high degree of accuracy in order to determine its steerability and stability.

In order to detect the path of travel of an automotive vehicle under test, it is already known to utilize a method in which colored liquid is dropped from the front or rear of the automotive vehicle under test, hereinafter referred to in this specification as a test car, onto a test ground so that the path of travel may be detected from the traces of the colored liquid left on the test ground. However, it is time consuming to detect and measure traces manually over a wide test ground, and it takes a long time to obtain the correct results of measurements. Furthermore, when the test ground is sprayed with water, the colored liquid is mixed with water so that no clear trace may be left on the test ground.

The present invention was made to overcome the above and other problems encountered in the conventional methods. Briefly, stated, according to the present invention, the path of travel of a test car is traced by triangular surveying with a laser beam. The laser beam is swept through an angle so that the angular position of a test car may be detected in terms of electrical pulse spacing. The pulse spacing is measured by a timer with a high degree of accuracy and is converted by an electronic computer into $x$- and $y$-coordinates so that the path of travel may be automatically recorded. It is further possible to record automatically the travelling conditions of the test car.

In addition to automatic recording of the path of travel of the test car, the speed, acceleration, turning radius, etc. required for analysis of steerability and stability of the test car may be also recorded and measured with a high degree of accuracy.

According to the underlying principle of the present invention, the $x$-$y$ coordinate system is constructed over a test ground as shown in FIG. 1 of the accompanying drawings, and a pair of light sources such as laser beam sources $P_1$ and $P_2$ are located in spaced apart relation in the direction of the x-axis and adjacent thereto. The light beams emitted from the light sources $P_1$ and $P_2$ are swept by rotary mirrors $M_1$ and $M_2$, respectively, which rotate at the same rotational speed. A pair of reference reflectors $R_1$ and $R_2$ are located at a fixed point on the line interconnecting the centers of rotation of the rotary mirrors $M_1$ and $M_2$, and a reflector pole $Q_1$ is attached to the roof of the test car which travels over the test ground. A timer of the digital counter type is provided in order to measure a time interval from the moment when the light beam deflected by the rotary mirror $M_1$ or $M_2$ is incident to the reference reflecting mirror $R_1$ or $R_2$, to the moment when the light beam is incident upon the reflector pole $Q_1$ on the test car. Next, an electronic computer 1 computes the angle of the light beam and the coordinates of the test car from the time interval measured, and a data recorder 12 plots or records the factors which determine the path of travel of the test car as shown in FIG. 2 of the accompanying drawings.

The measuring instrument of the present invention, whose novel features have been described above, will be described in more detail hereinafter with reference to the accompanying drawings in which.

Figure 1:
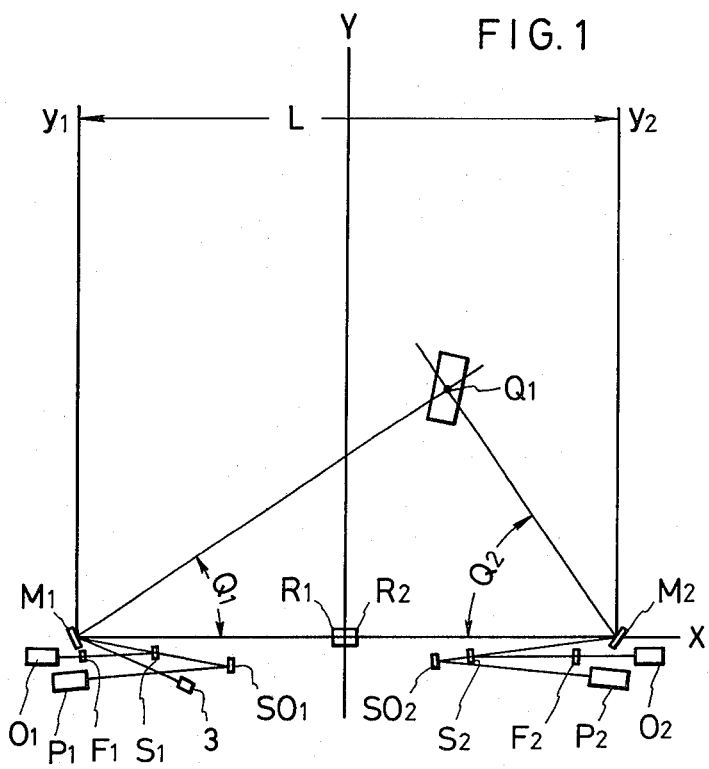
FIG. 1 is a schematic plan view of a test ground, a test car and a measurement instrument in accord with the present invention for detecting and measuring the travelling course or path of the test car on the test ground.

Referring to FIG. 1, the $x$-$y$ coordinate system is constructed over a test zone on the ground, and a pair of rotary mirrors $M_1$ and $M_2$ are located upon a base line on the x-axis and spaced apart from each other by a distance L. Light sources such as laser beam sources $P_1$ and $P_2$ are located adjacent to the rotary mirrors $M_1$ and $M_2$, respectively. As will be described hereinafter these optical means are housed within two optical measuring stands. The rotary mirrors $M_1$ and $M_2$ rotate in opposite directions in synchronism with each other at the same rotational speed. At the midpoint between the pair of rotary mirrors $M_1$ and $M_2$ are located a pair of reflectors $R_1$ and $R_2$ which are adapted to redirect the light beams emitted from the light source $P_1$ and $P_2$ back to them, respectively. It should be noted that the rotary mirrors $M_1$ and $M_2$, the light sources $P_1$ and $P_2$ and the reflectors $R_1$ and $R_2$ are located at a predetermined height $d$ from the ground, see FIG. 1a.

Figure 1A:
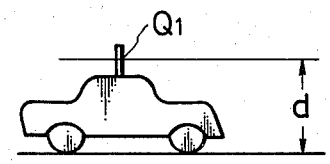
FIG. 1a is a side elevation of the test car.
Figure 2:
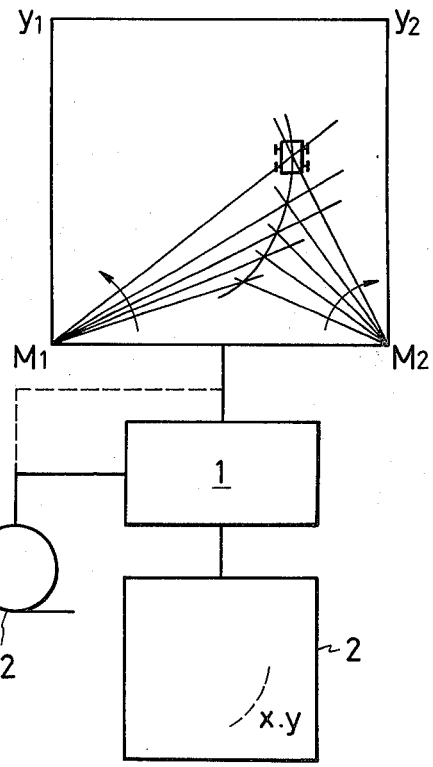
FIG. 2 is a schematic plan view illustrating the optical detecting section, and electronic computer and a data recorder.

As shown in FIG. 1a, a reflector pole $Q_1$, comprising cornercube reflectors which redirect the light beams back to the light sources $P_1$ and $P_2$, is attached to the roof of a test car.

In FIG. 1, $S_1$ and $S_2$ designate half-mirrors; $SO_1$ and $SO_2$, mirrors; $F_1$ and $F_2$, filters; and $O_1$ and $O_2$, light beam reception means.

As will be readily appreciated, the position of the reflector pole $Q_1$, and hence of the test car, can be detected from the angles $\theta_1$ and $\theta_2$ which the two light beams make with the x-axis as shown in FIG. 1. These angles may in turn be calculated from the sweeping time of the light beams. In the instant embodiment, the rotary mirrors $M_1$ and $M_2$ make ten rotations per second so that the light beam emitted from the light source $P_1$ may sweep the square test ground in 1/80 second. The angle $\theta_1$ may be obtained by measuring a time interval from the moment when the light beam emitted from the light source $P_1$, and redirected by the rotary reflecting mirror $M_1$, is incident upon the reflecting mirror $R_1$ to the moment when the beam is incident upon the reflector pole $Q_1$ attached to the test car. This time interval may be obtained by a digital counter type timer with a high degree of accuracy. In like manner the angle $\theta_2$ may be obtained. More particularly, the laser beam emitted from the light source $R_1$ is redirected by the reflecting mirror $SO_1$ toward the rotary mirror $M_1$ through the half-mirror $S_1$, and the beam reflected back by the reference reflecting mirror $R_1$ or reflector pole $Q_1$ on the test car is redirected by the rotary mirror $M_1$ toward the half-mirror $S_1$ so that the beam reflected by the half-mirror $S_1$ may be incident through the filter $F_1$ upon the light beam reception means $O_1$. The light beam reception means $O_1$ converts the light beam incident thereupon into the electrical pulse signal. A time interval between these two electrical pulses is measured by the digital counter type timer. Thus, the angles $\theta_1$ and $\theta_2$ may be obtained by $$\theta_1 = 7200\, t_1 \qquad (1)$$
$$\theta_2 = 7200\, t_2$$

where $t_1$ and $t_2$ = time interval between the moment when the light beam reflected back from the reference reflecting mirror $R_1$ or $R_2$ is incident upon the light beam reception means $O_1$ or $O_2$, and the moment when the light beam reflected back from the reflecting pole $Q_1$ on the test car is incident upon the light beam reception means $O_1$ or $O_2$.

Therefore, the x- and y-coordinates of the reflecting pole $Q_1$ or the test car are obtained from the following equations:

$$x_1 = \frac{L}{\cot \theta_1 + \cot \theta_2}$$
$$y_1 = \frac{L \cot \theta_1}{\cot \theta_1 + \cot \theta_2} \qquad (2)$$

The output of the digital counter type timer is converted into the analog signal and applied to an analog electronic computer 1 so that the angles $\theta_1$ and $\theta_2$ and the coordinates $x_1$ and $y_1$ may be obtained from the equations (1) and (2).

The output of the analog computer 1 is fed into a data recorder or plotter so that the position of the test car may be plotted as a dot every 1/10 second.

It will be readily appreciated that the direction of the test car may be detected in a manner substantially similar to that described hereinbefore when two reflector poles are attached on the roof of the test car.

Figure 3:
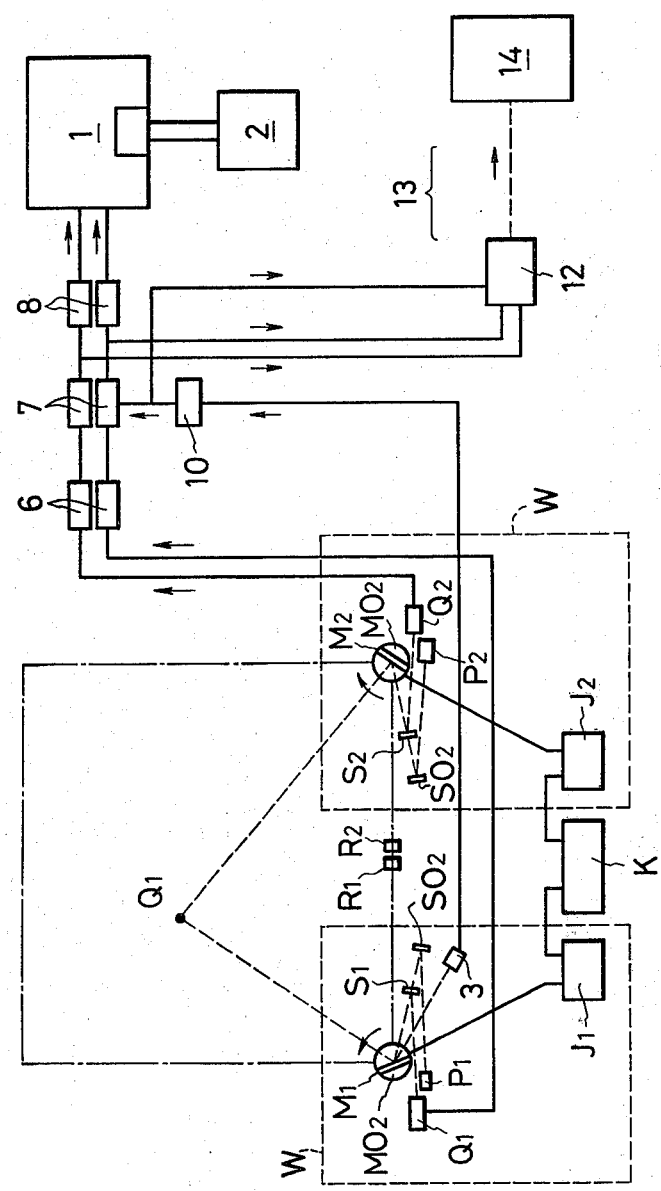
FIG. 3 is a block diagram of the measuring instrument.

The measuring instrument shown in FIG. 3 includes the following components:
- a pulse shaper and amplifier 6;
- a digital counter type timer 7 (with a reference signal of 10 MHz);
- a digital-to-analog converter 8;
- an analog computer 1;
- an x-y recorder or plotter 2;
- a reset pulse shaper 10;
- a digital data recorder 12;
- a digital computer 14;
- means for controlling the rotational speed of the rotary mirrors, $J_1$ and $J_2$;
- servomotors $MO_1$ and $MO_2$ for controlling the speed;
- a pair of measuring stand W; and
- an oscillator K of good frequency stability for generating a reference signal used for controlling (the rotational) speed of the reflecting mirrors.

The output signals of the light beam reception means $O_1$ and $O_2$ are shaped by the pulse shapers 6, and the time interval between the two pulses is measured by the digital counter type timers 7. The digital (BCD) outputs of the timers 7 are converted into the analog signals by the digital-to-digital converters 8 and applied to the analog computer 1.

The outputs of the digital counter type timers 7 are also recorded on tape by the digital data recorder 12 and processed by the digital computer 12.

The pulse from a photoelectric cell 3 is shaped by the pulse shaper 10 to provide a reset signal for resetting the digital counter type timers 7 and the digital recorder 12.

The pulse shapers 6 and 10 serve not only for shaping the pulse waveform but also for amplifying the shaped pulses and are of a type well known in the art. The clock pulse of 10 mHz is applied to the digital counter type timer so that the latter may measure time intervals of 0.1 microsecond. In response to the first pulse, a gate is opened and in response to the next pulse it is closed. The counter counts the clock pulses from the time when the gate is opened to the time when the gate is closed.

The counter is of a type well known in the art. Since it is reset in response to the reset pulse of 0.1 second, the time required for resetting the counter must be sufficiently short.

The digital-to-analog converter 8 is adapted to convert the digital output signal (BCD output) of the counter into the analog voltage and is of a type well known in the art. It is preferable to select a digital-to-analog converter with a high degree of accuracy.

The digital data recorder 12 is adapted to record the outputs (BCD outputs) of the counters in response to the reset pulse and is of a type well known in the art. It is preferable that the recording speed of the digital data recorder be sufficiently high.

Figure 4:
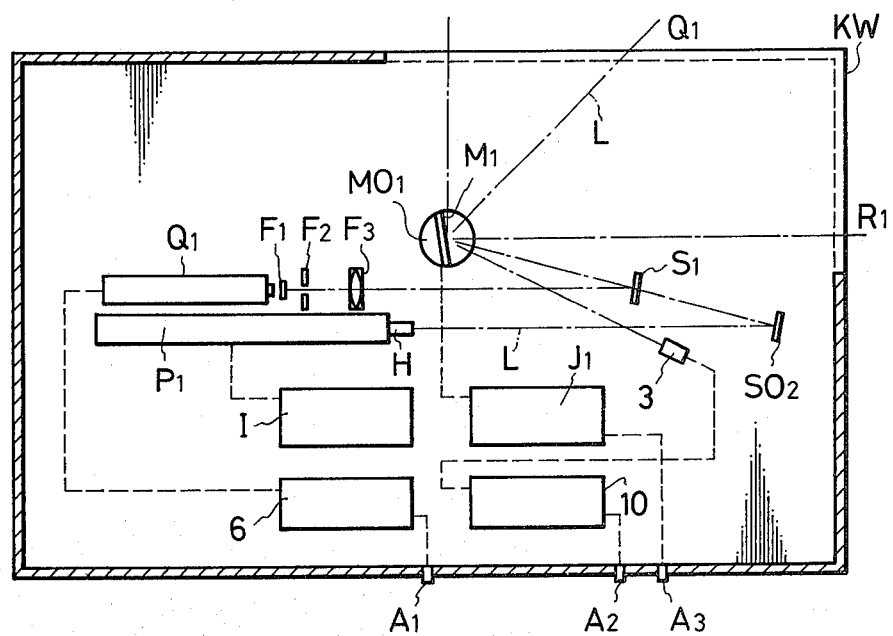
FIG. 4 is a view of a left hand side measuring station.

The left-hand measuring station shown in FIG. 4 incorporates the following components:
- a laser beam source, HeNe laser, $P_1$;
- an electric power supply I;
- a beam expander H adapted to expand the diameter of the beam spot to about 20 mm;
- a reflecting mirror $SO_2$ with a high degree of optical surface quality;
- a half-mirror $S_1$ with a high degree of optical surface quality and capable of transmitting 50% of light and reflecting 50% of light;
- a rotary mirror $M_1$ with a high degree of optical surface quality;
- a condenser lens $F_3$;
- a stop $F_2$, with a diameter of about 2 mm;
- an interference filter $F_1$ adapted to transmit therethrough only the He-Ne laser beam;
- a light beam reception means with a photomultiplier $Q_1$;
- a light beam reception means 3 with a photoelectric cell;
- a pulse shaper 6 with a high constant voltage supply for the photomultiplier;
- a pulse output terminal $A_1$;
- a reset pulse shaper 10;
- a reset pulse output terminal $A_2$;
- means $J_1$ for controlling the speed of a servomotor for the rotary mirror;
- an input terminal $A_3$ to which is applied the signal for controlling the rotational speed from the reference frequency oscillator; and a window KW through which the laser beam is swept.

The optical components in the stand are optically aligned, and the stand is set to a height $d$ from the ground. The laser beam is emitted as indicated by the two chain-dotted lines.

The diameter of the laser beam emitted from the laser source $P_1$ is of the order of 1–2 mm, and the diameter of the beam spot is expanded to about 20 mm by the beam expander H. The parallelism of the beam is also improved and the optical surface qualities of the mirror $SO_2$, the half-mirror $S_1$ and the rotary mirror $M_1$ must be such that the parallelism of the beam reflected by these mirrors is not adversely affected.

The light beam reflected back by the reflecting pole or reference reflector travels back along the same optical path and is redirected by the rotary mirror $M_1$ and the half-mirror $S_1$ so as to be incident upon the condenser lens $F_3$, which in turn condenses the light beam very efficiently even when the light beam is bent. The condensed light beam passes through the stop $F_2$ and the interference filter $F_1$ and is incident upon the light beam reception means. The stop $F_2$ and the filter $F_1$ serve to transmit therethrough only the required components of the light beam, thereby eliminating external "noise".

The rotary mirror driving motor $MO_1$ has a precise rotational speed and is controlled by the control means $J_1$.

In the control system in the instant embodiment, the signal from the reference frequency oscillator (see FIG. 3) is applied to the input terminal $A_3$ so that speed control may be effected in response to the difference between the applied signal and the pulse signal from a pick-up directly coupled to the shaft of the motor in order to pick up the rotational speed thereof. The response of the control system is very rapid. In order to minimize the change in rotational speed, the inertia of the rotary mirror as well as the motor must be minimized. Furthermore, they must be manufactured with a high degree of manufacturing tolerance so as to be controlled with high precision.

The right-hand measuring station has similar component parts, except for means for generating the reset pulse, which are disposed in symmetrical relation with those of the left-hand station.

Figure 5A:
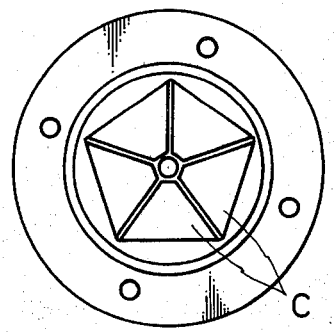
FIGS. 5a and 5b are respectively a plan view and a side elevation of a reflector pole to be attached to the test car.
Figure 5B:
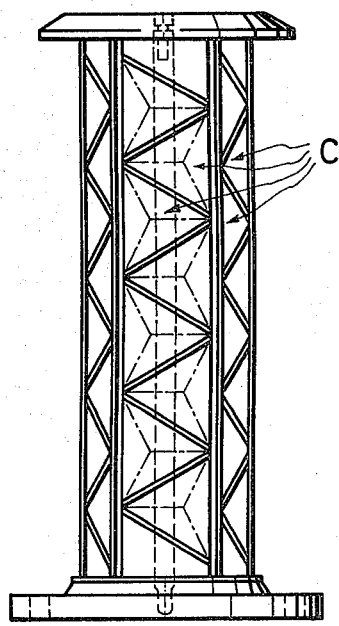

Referring now to FIGS. 5a and 5b, the reflecting pole is in the form of pentagonal prism, and eight cornercube reflectors C are attached on each side surface. The surface, as well as the angles, of the cornercube reflector C must be finished with a high degree of accuracy so that incident light may be reflected back precisely to the light source.

Figure 6:
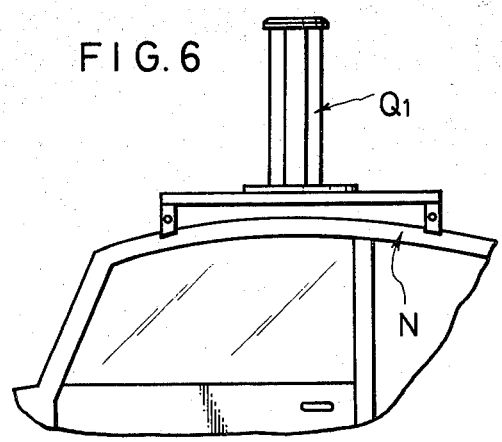
FIG. 6 is a side view of a reflector pole and a portion of the roof of a test car to which it is attached.

FIG. 6 shows the reflecting pole attached to the roof N of the test car. The height of the reflecting pole must be so selected that the light beam may be incident to and reflected back by the reflecting pole even when the latter's position is lowered due to rolling of the test car.

Figure 7A:
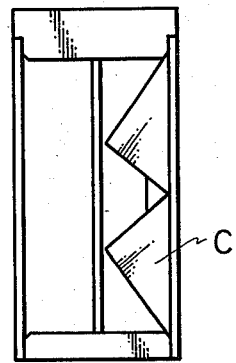
FIGS. 7a and 7b are respectively a side elevation and a front elevation of a reference reflecting mirror.
Figure 7B:
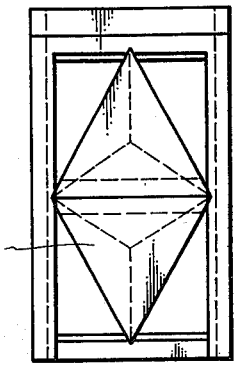

FIGS. 7a and 7b show a reference reflector comprising two cornercube reflectors whose surfaces and angles must be also finished with a high degree of accuracy, as in the case of the reflecting pole.

Figure 8:
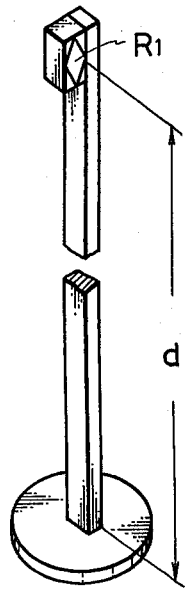
FIG. 8 is a perspective view of a reference reflecting mirror stand.

FIG. 8 shows the reference reflector stand upon which the cornercube reflectors are mounted at a height $d$ from the ground.

Figure 9A:
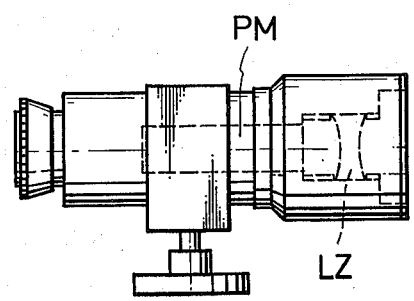
FIGS. 9a and 9b are respectively a side elevation and a front elevation of a light beam reception means.
Figure 9B:
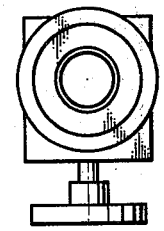
Figure 10:
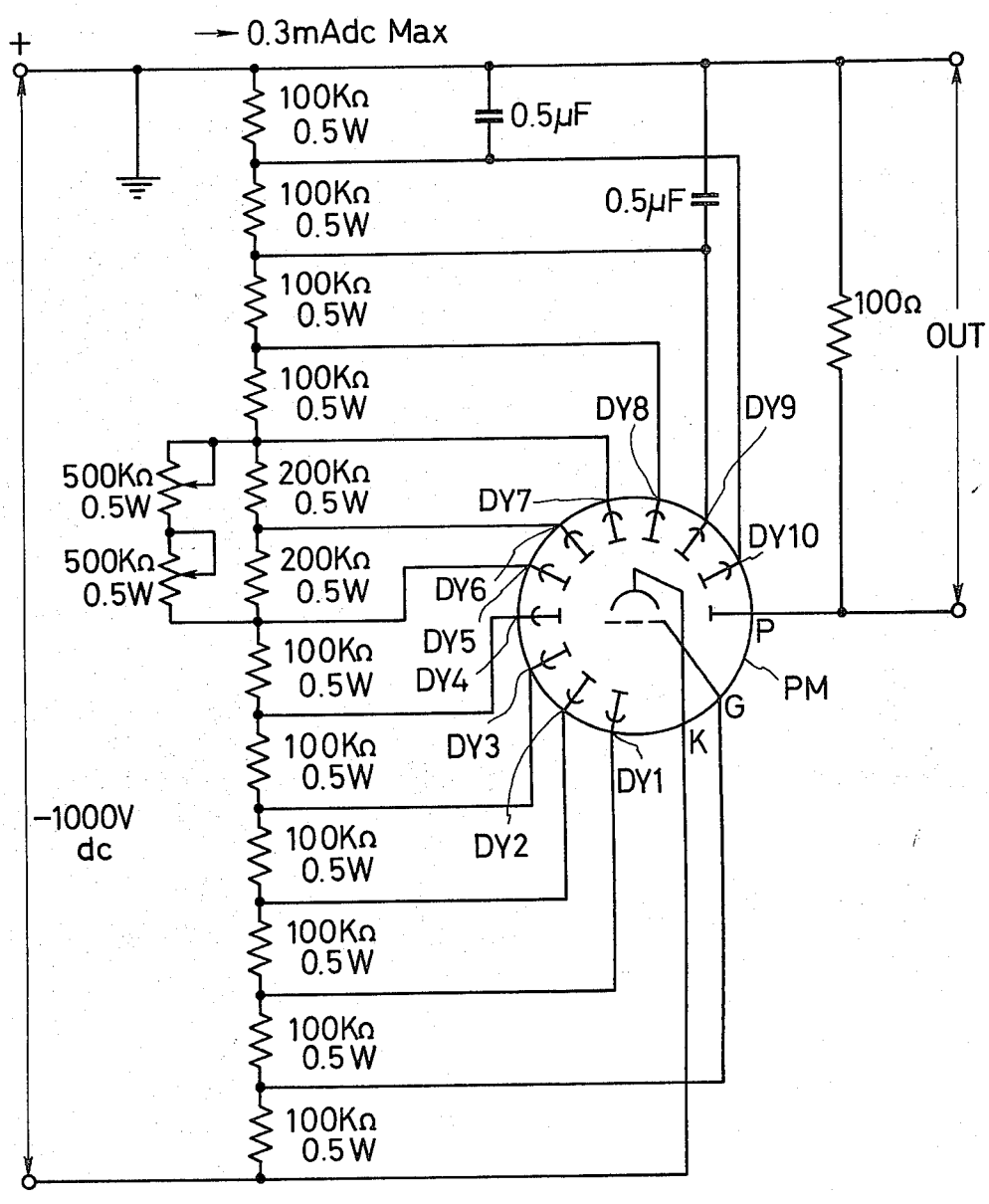
FIG. 10 is a circuit diagram of a photomultiplier.

FIGS. 9a and 9b show a light beam reception means with a photomultiplier PM and a concave lens L which serves to prevent light rays from being locally incident upon the tube PM. The photomultiplier tube PM must be sensitive to the laser beam. As shown in FIG. 10, a high constant voltage (DC 1000V) is applied to the photomultiplier tube PM, and its associated circuit must be highly responsive. Since the photomultiplier tube PM and its associated circuit are well known to the art, no further description will be made in this specification.

Figure 11:
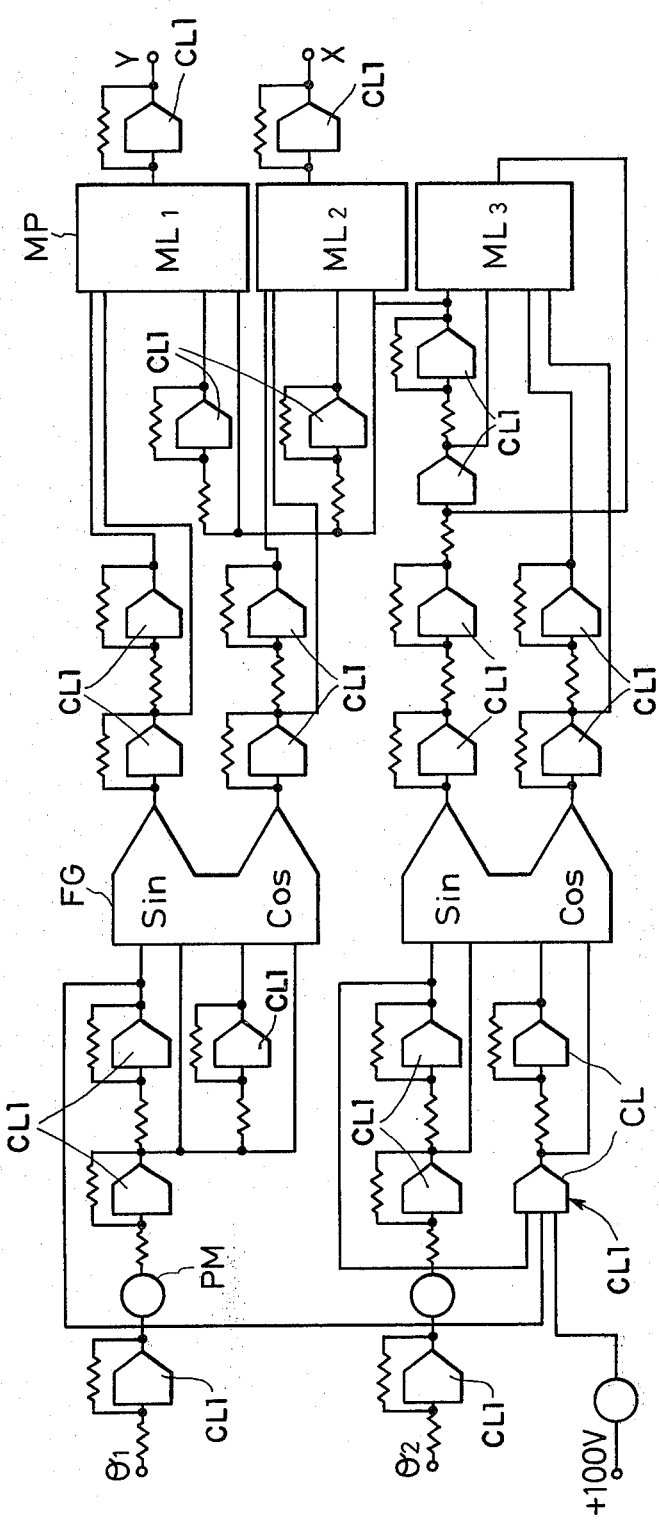
FIG. 11 is a circuit diagram of an analog computer used in the present invention.

FIG. 11 is a block diagram of an analog computer adapted to carry out the operation of equations (1) and (2). The analog computer includes operational amplifiers CL, potentiometers PM, trigonometric function generators FG and multipliers ML.

Formula (2) may be replaced with the formula as follows $$x = -\frac{L \sin \Theta_2}{\left(\cos + (\Theta_1 + \Theta_2 + \frac{\pi}{2})\right)} \sin \Theta_1$$

$$y = -\frac{L \sin \Theta_2}{\cos \left(\Theta_1 + \Theta_2 + \frac{\pi}{2}\right)} \cos \Theta_1 \quad (3)$$

In FIG. 11, input $\theta_1$ is converted to a function of $\sin \theta_1$ and $\cos \theta_1$ by a function generator. Input $\theta_2$ is converted to a function of $\sin \theta_2$ by another function generator. The values of $\theta_1$, $\theta_2$ and $\pi/2$ are added to obtain $(\theta_1 + \theta_2 + \pi/2)$ for the calculation of operational amplifier $CL_1$.

The input voltage of 100V is used to introduce the constant $\pi/2$ by the potentiometer. The value $(\theta + \theta_2 + \pi/2)$ is converted to $\cos(\theta_1 + \theta_2 + \pi/2)$ by the function generator.

Multiplier $ML_3$ serves for the calculation of deviding $(L \sin \theta_2)$ by $\cos(\theta_1 + \theta_2 + \pi/2)$, while multiplier $ML_2$ is utilized for the calculation of multiplying (A) by $\cos \theta_1$ to obtain the value of X.

The conventional systems for tracing the travelling courses of a test car were primitive with the result of unsatisfactory degree of accuracy in measurement. However, according to the present invention, the travelling courses of a test car may be automatically traced in a scientific manner with a higher degree of accuracy by a device simple in construction. Furthermore, opposed to the conventional systems the device of the present invention may obtain also various test data required for analysis of maneuverability and stability of the test car simultaneously when the travelling courses thereof are automatically traced in the manner described above.

I claim:

1. A method, for automatically determining the path of travel of a vehicle in relation to a base line of a predetermined test zone wherein the vehicle is provided with a beam reflector and caused to move in the test zone, which includes the steps of:
    a. producing two beams of light originating at points spaced along said base line,
    b. rotating each beam of light in synchronism about an axis, normal to the test zone, located at the respective point, such that each beam sweeps from the base line towards the vehicle,
    c. determining for each beam, the interval of time occurring between the moment when the beam is aligned with the base line and the moment when the beam is incident upon the reflector of the vehicle, d. converting each of said time intervals into x- and y-coordinate information respectively, and e. plotting functions of movement of the vehicle over the test zone from said x- and y-coordinate information.

2. An apparatus, for determining the path of travel of a vehicle in relation to a base line bounding a test zone, comprising:

a. two rotatable mirros each having its axis of rotation normal to said test zone, said mirros having their respective axes of rotation at spaced points on said base line, b. two light-beam producing means disposed at spaced positions adjacent to said base line and each adapted to cast its beam onto a respective one of said rotatable mirros, c. two stationary reflectors disposed on said base line and each positioned to reflect a beam received from a respective one of said rotatable mirros, d. light beam reflecting means mounted on a test vehicle to be moved over said test zone, e. motor means for rotating said rotatable mirrors in synchronism, f. light-beam-receiving means disposed adjacent to said base line to receive light beams from said rotating mirrors, g. a pair of digital timers responsive to said respective light beam receiving means for measuring time intervals between the mount when a light beam from each rotating mirror strikes the respective stationary reflector, and the moment when said light beam strikes said vehicle mounted reflecting means, h. an electronic computer means connected to said digital timers for processing said time intervals to produce $x$- and $y$-coordinate information, and i. means connected to said computer responsive to said $x$- and $y$-coordinate information for plotting functions of movement of the vehicle on the test zone.

* * * * *